US011307105B1

(12) United States Patent
Prescher

(10) Patent No.: US 11,307,105 B1
(45) Date of Patent: Apr. 19, 2022

(54) TORQUE METER SHAFT WITH ROTATIONAL SLIP ENABLED SENSOR INDICATING TABS

(71) Applicant: The United States of America, as represented by the Secretary of the Navy, Patuxent River, MD (US)

(72) Inventor: Kurt Prescher, Hollywood, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/221,133

(22) Filed: Apr. 2, 2021

(51) Int. Cl.
*G01L 3/04* (2006.01)

(52) U.S. Cl.
CPC ..................... *G01L 3/04* (2013.01)

(58) Field of Classification Search
CPC ........................................... G01L 3/04
See application file for complete search history.

(56) References Cited

U.S. PATENT DOCUMENTS

| 1,135,741 | A | * | 4/1915 | Turner | G01L 3/101 73/862.27 |
| 4,899,596 | A | * | 2/1990 | Janik | G01L 25/003 73/1.11 |
| 6,948,381 | B1 | * | 9/2005 | Discenzo | G01L 3/12 73/800 |
| 6,981,423 | B1 | * | 1/2006 | Discenzo | G01L 3/12 73/800 |
| 7,322,250 | B1 | * | 1/2008 | Discenzo | G01L 3/12 73/800 |
| 7,458,277 | B2 | * | 12/2008 | Discenzo | G01L 1/241 73/800 |
| 10,612,987 | B2 | * | 4/2020 | Atkins | B64C 27/006 |
| 2008/0041141 | A1 | * | 2/2008 | Discenzo | G01L 1/241 73/66 |
| 2019/0368954 | A1 | * | 12/2019 | Atkins | B64C 27/12 |
| 2020/0319042 | A1 | * | 10/2020 | Hale | B64C 27/12 |

* cited by examiner

*Primary Examiner* — Freddie Kirkland, III
(74) *Attorney, Agent, or Firm* — Mark O. Glut; NAWCAD

(57) ABSTRACT

A torque meter shaft that includes a hollow tube, a ring with ring tabs, the ring enveloping the hollow tube, a shaft with shaft tabs and a deformable section, the shaft disposed within the hollow tube such that the ring tabs and the shaft tabs correspond forming an inter-locking non-contact fit, and a first spline coupling and a second spline coupling. The first spline coupling communicates with an engine such that torque from the engine is transferred to the deformable section and elastically deforms when torque is applied to the first spline coupling and the shaft tabs change radial position relative to the position of the ring tabs such that relative change in torque can be measured, and when torque results in creating a shaft deformation that passes the material yield point, the ring tabs and shaft tabs contact each other, and the ring tabs are pushed back into a new position that compensates for the shaft deformation allowing the engine to maintain its full power capacity.

1 Claim, 2 Drawing Sheets

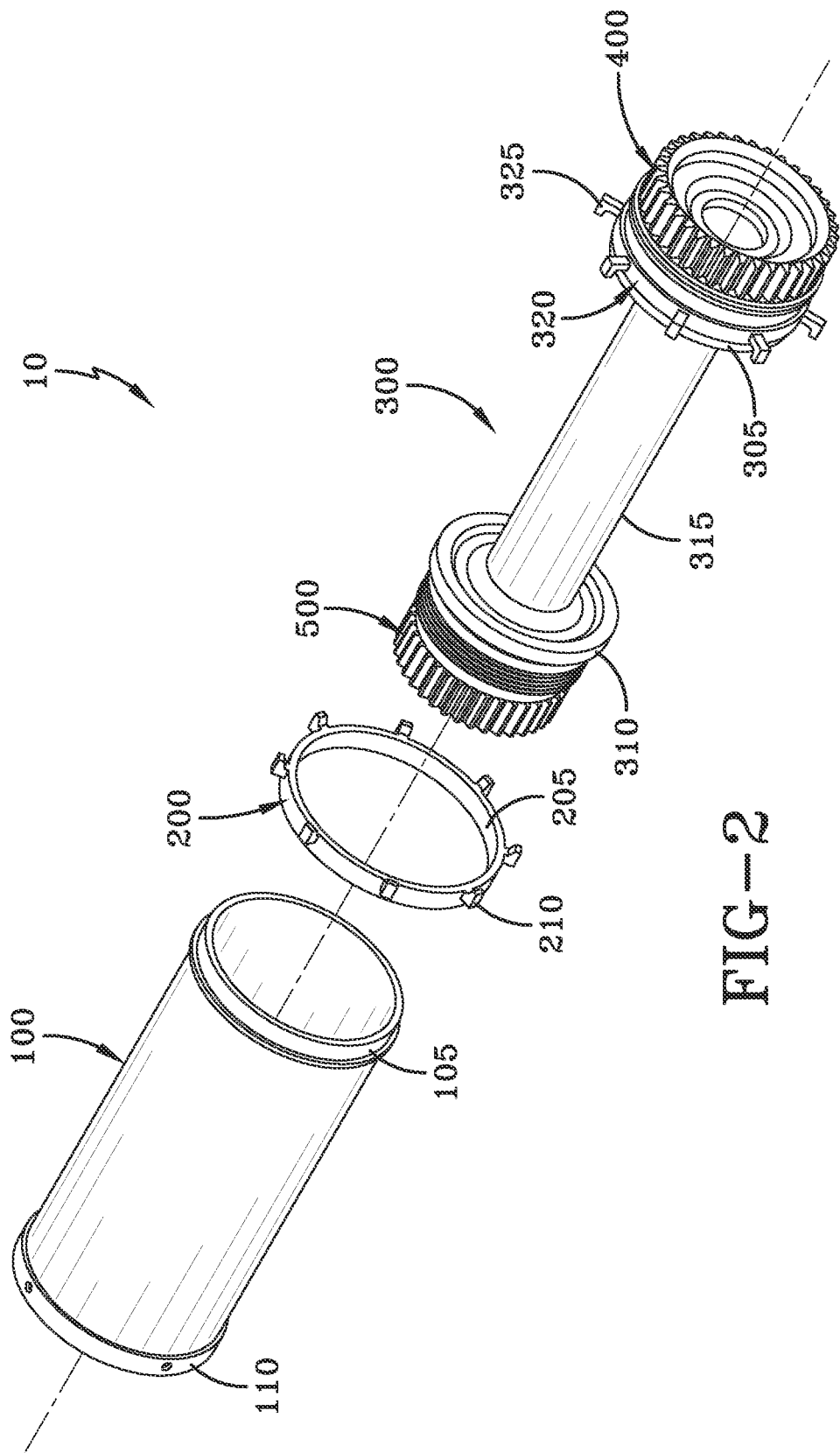

TORQUE METER SHAFT WITH ROTATIONAL SLIP ENABLED SENSOR INDICATING TABS

STATEMENT OF GOVERNMENT INTEREST

Figure 1:
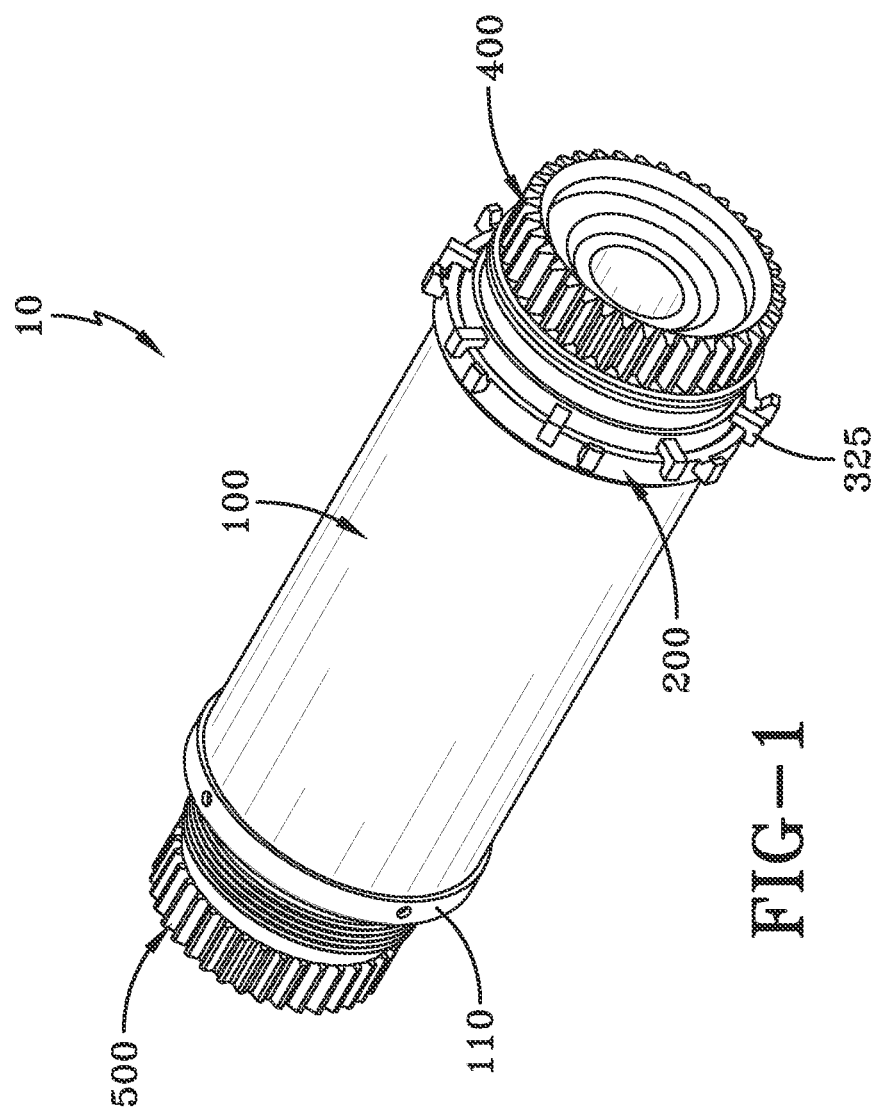

The invention described herein may be manufactured and used by or for the Government of the United States of America for governmental purposes without payment of any royalties thereon or therefor.

BACKGROUND

A torque meter may be defined, but without limitation, as an instrument that measures torque. Torque may be defined, but without limitation as, a twisting force that describes the engine's rotational force and measures how much of that twisting force is available when an engine exerts itself. Typically, a torque meter includes a torque meter shaft. In an uncommon occurrence of high torque exceeding the design limits of the torque shaft, the torque shaft plastically deforms creating a measurement offset that results in an error in torque monitoring. This error shows a false positive indication in engine torque output, resulting in less output than indicated.

SUMMARY

The present invention is directed to a torque meter with the needs enumerated above and below.

It is a feature of the present invention to provide a torque meter shaft with rotational slip enabled sensor indicating tabs that provides a correctional offset if contact between the tabs in the torque meter shaft is encountered.

It is a feature of the present invention to provide a torque meter shaft that provides a relief prior to material failure of the tabs caused by hard contact.

It is a feature of the present invention to provide a torque meter shaft that provides continued temporary usage of a damaged torque meter shaft to improve the accuracy of torque indication to the engine, thereby, improving safety of flight.

DRAWINGS

These and other features, aspects and advantages of the present invention will become better understood with reference to the following description and appended claims, and accompanying drawings wherein:

FIG. 1 is a an perspective view of the torque meter shaft assembly with rotational slip enabled sensor indicating tabs; and, FIG. 2 is an exploded perspective view of the torque meter shaft assembly with rotational slip enabled sensor indicating tabs.

DESCRIPTION

The preferred embodiments of the present invention are illustrated by way of example below and in FIGS. 1-2. As seen in FIGS. 1 and 2, the torque meter shaft 10 includes a hollow tube 100, a ring 200, a shaft 300, a first spline coupling 400, and a second spline coupling 500. The hollow tube 100 has a first hollow tube end 105 and a second hollow tube end 110. The ring 200 has a ring outer diameter 205, with the ring 200 enveloping the hollow tube 100 at the first hollow tube end 105. The ring 200 has ring tabs 210 disposed on the ring outer diameter 205. The shaft 300 has a first shaft end 305, a second shaft end 310, and a deformable section 315 with a material yield point. The shaft 300 has a shaft outer diameter 320 and shaft tabs 325. The shaft tabs 325 are disposed on the shaft outer diameter 320 at the first shaft end 305, and the shaft 300 is disposed within the hollow tube 100 such that the ring tabs 210 and the shaft tabs 325 correspond forming an inter-locking non-contact fit. The first spline coupling 400 is disposed at the first shaft end 305 and the second spline coupling 500 is disposed at the second shaft end 310. The first spline coupling 400 communicates with an engine (not shown) such that torque from the engine is transferred to the second shaft end 310 and the shaft 300 elastically deforms when torque is applied to the first spline coupling 400. This deformation changes the radial position of the shaft tabs 325 relative to the position of the ring tabs 210 such that relative change in torque can be measured. When a torque applied creates a deformable shaft deformation of the shaft 300 in the deformable section 315 that exceeds the material yield limit of the deformable section 315, the ring tabs 210 and shaft tabs 325 contact each other and the ring tabs 210 transfer the rotational movement into the ring 200, which moves into a new position when the friction of the interference fit to the first hollow tube end 105 is exceeded. This new position compensates for the shaft deformation, allowing the engine to maintain its full power capacity.

In the description of the present invention, the invention will be discussed in a military environment; however, this invention can be utilized for any type of application that requires use of any type of application when torque measurement with an overtorque compensation is required.

Under normal operating conditions, the position of the ring tabs 210 will be unaffected. When a torque applied creates a shaft deformation in the deformable section 315 that exceeds the material yield limit of the shaft 300, the ring tabs 210 and the shaft tabs 325 contact each other and push the ring tabs 210. Under this condition of torque, the invention will allow the ring tabs 210 to be moved radially to a new position. The invention, allowing the movement of the ring tabs 210, allows the engine to maintain its full power capacity.

The ring 200 has sufficient sizing to provide a friction interference fit to the hollow tube 100 at the first hollow tube end 105, which provides adequate positional stability for normal operation and rotation when contact of the ring tabs 210 and the shaft tabs 325 occurs in overtorque operation. The shaft deformation of the shaft 300 in the deformable section 315 that exceeds the material yield limit of the shaft 300 requires a change of the entire torque meter shaft assembly 10 after the subject flight. The feature provides a method of continuing flight with a reduced capacity torque meter shaft assembly 10 for the subject flight on a temporary basis.

In one of the embodiments of the invention, the first spline coupling 400 has first coupling teeth that mesh with mating coupling teeth in the mating coupling on the engine (not shown). This allows torque to transfer through the shaft 300, whereas the second spline coupling 500 also have spline coupling teeth that mesh with teeth in the mating coupling on the transmission of the engine. This completes the power loop and allows a transfer torque to the transmission, maintaining the angular correspondence between them.

In another embodiment, the second hollow end tube 110 may be affixed to the shaft 300 at the second shaft end 310, with rivets in equally spaced radial locations around the diameter.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A torque meter shaft for use on an engine, the torque shaft comprising:
   a hollow tube having a first hollow tube end and a second hollow end tube;
   a ring with an ring outer diameter, the ring enveloping the hollow tube at the first hollow tube end, the ring having ring tabs disposed on the ring outer diameter;
   a shaft having a first shaft end, a second shaft end, and a deformable section with a material yield point, the shaft having an shaft outer diameter and shaft tabs, the shaft tabs disposed on the shaft outer diameter at the first shaft end, the shaft disposed within the hollow tube such that the ring tabs and the shaft tabs correspond forming an inter-locking non-contact fit; and,
   a first spline coupling and a second spline coupling, the first spline coupling is disposed at the first shaft end and the second spline coupling is disposed at the second shaft end, the first spline coupling communicating with an engine such that torque from the engine is transferred to the second shaft end and the deformable section elastically deforms when torque is applied to the first spline coupling and the shaft tabs change radial position relative to the position of the ring tabs such that relative change in torque can be measured, and when torque results in creating a deformable section deformation that passes the material yield point of the deformable section, the ring tabs and the shaft tabs contact each other, and the ring tabs are pushed back into a new position that compensates for the shaft deformation allowing the engine to maintain its full power capacity.

* * * * *